July 31, 1962  P. R. DESCHERE  3,047,154
LIQUID FILTER
Filed Jan. 13, 1958  2 Sheets-Sheet 1
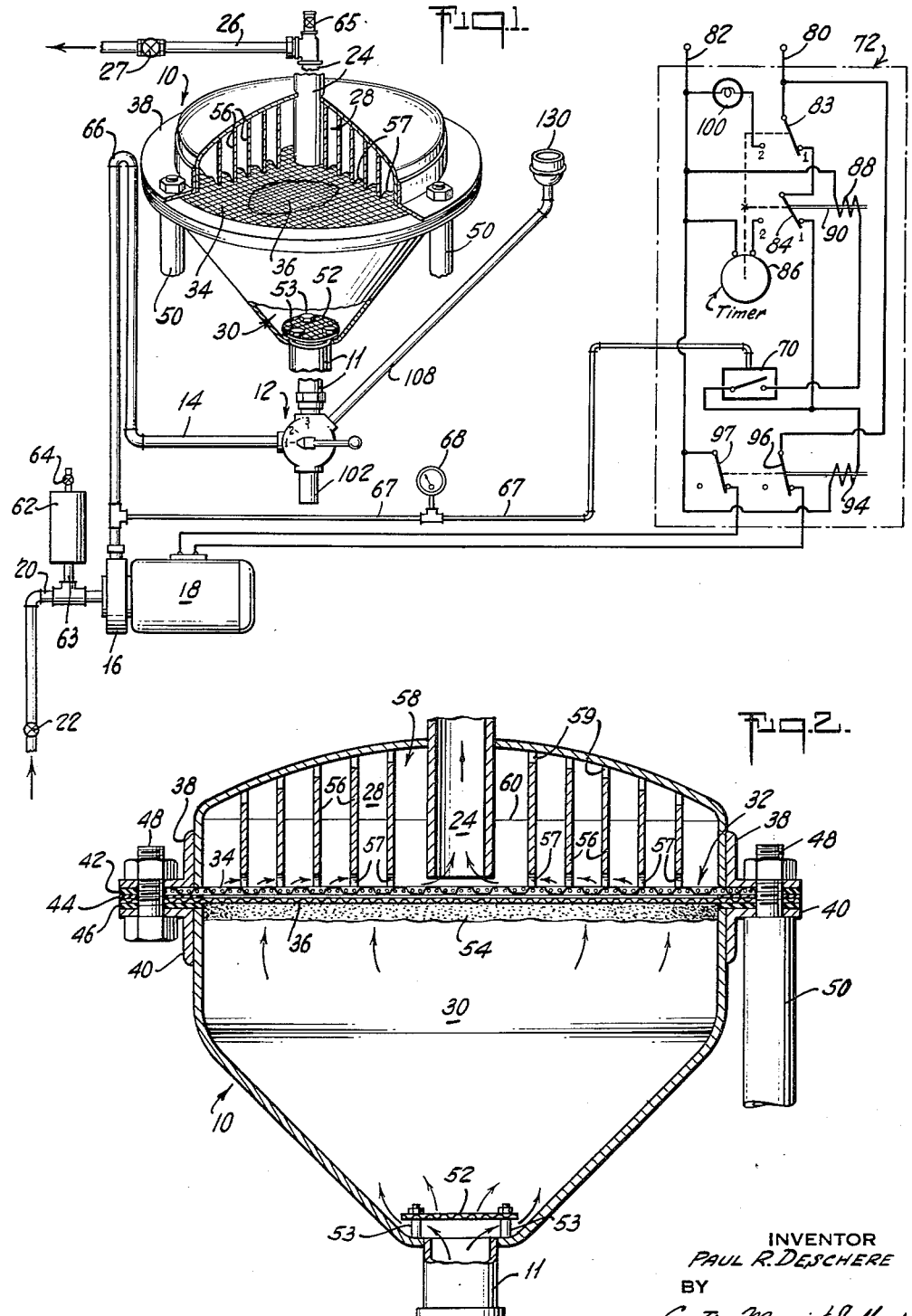
INVENTOR
PAUL R. DESCHERE
BY
Curtis, Morris & Safford
ATTORNEYS July 31, 1962    P. R. DESCHERE    3,047,154
LIQUID FILTER Filed Jan. 13, 1958    2 Sheets-Sheet 2

INVENTOR
PAUL R. DESCHERE
BY
Curtis, Morris & Safford
ATTORNEYS 3,047,154
LIQUID FILTER
Paul R. Deschere, 16 Park Ave., New York, N.Y.
Filed Jan. 13, 1958, Ser. No. 708,470
2 Claims. (Cl. 210—100)

This invention relates to a filter for removing suspended solids, including very fine particles, from various liquids, such as water intended for drinking or bathing, for example.

An object of this invention is to provide a filter which uses "filter aid" for maximum effectiveness but which is simple and uncomplicated.

Another object is to provide filter apparatus of this kind which operates automatically to regenerate or recondition its charge of filter aid whenever necessary to maintain efficiency.

A further object is to provide such a filter which is relatively inexpensive and which is extremely reliable and very easy to service.

These and other objects will in part be understood from and in part pointed out in the description given hereinafter.

One of the most effective kinds of liquid filters is that which uses a thin precoat layer or cake of filter aid (powdered diatomaceous earth) through which the liquid is passed and which entraps and removes from the liquid the sludge or solid material suspended in it. The ability of filter aid to remove extremely fine particles from a liquid is exceptional, in fact even sub-micron particles in a colloidal suspension can be filtered out. Thus, for example, ordinary city drinking water (which we usually think of as clean and pure) can be passed through a cake of filter aid and a surprising amount of sludge or slime extracted. The filtered water will have sparkling clarity, in fact its clarity will be so great that small objects will be clearly visible on the bottom of a swimming pool, for example, whereas with water directly from many city mains not even the bottom of the pool would be seen.

Though the effectiveness of filter aid type filters is well known, one of the main reasons why they were not in the past more widely used has been the difficulty in servicing and maintaining them. In all such filters as more and more slime is extracted from a flowing liquid, the surface of the filter aid cake becomes covered and clogged so that less and less liquid can pass through. Thus in time, depending upon how contaminated the liquid is, flow through the filter drops precipitously. To remedy this it is necessary in some way to regenerate or recondition the filter aid cake.

In the past various ways of regenerating the filter aid cake in a filter have been devised. The most straightforward way was to open the filter, flush out the used charge of filter aid, and replace it with a new charge. This however required the frequent services of a maintenance man and necessitated the shutting off of the filter for a certain length of time. For this reason, there have been devised various more or less automatic ways of entirely removing the used filter aid cake by breaking it away from its support and then flushing out the used filter aid. However, the equipment required to accomplish this was previously either complicated and expensive or else unreliable. The present invention provides filter apparatus of the filter aid type which operates automatically to rejuvenate a filter aid cake a number of times but yet this apparatus is simple and very reliable.

In accordance with the present invention there is provided a liquid filter having a housing divided into upper and lower chambers by a horizontal filter septum. Liquid to be filtered is supplied at the bottom of the housing and flows upward through the septum and out the top of the housing. Contained in the lower chamber of the housing is a charge of filter aid which, when liquid is flowing, forms into a cake or layer against the underside of the septum. During flow, this cake entraps solids suspended in the liquid while allowing the latter to pass with relative ease. When the supply of liquid to the filter is turned off, the pull of gravity aided by a small amount of back or downward flow through the septum occurs and this quickly breaks the cake of filter aid away from the septum and permits it to fall. In falling, the cake is partially disintegrated and the slime which may have accumulated as a surface layer is dispersed. As soon as liquid is again supplied to the filter, the fallen cake is reslurried with the slime and sludge distributed throughout it and is reformed on the septum as a cake with a fresh surface. Since the solid matter previously extracted is now dispersed, instead of concentrated as a barrier on the surface of the cake, liquid is able to flow through it virtually unimpeded. By periodically re-forming the cake in this manner, its usefulness or life is greatly extended. After a given charge of filter aid has become saturated with extracted solids, it is drained from the lower chamber and a fresh charge introduced. This is done manually but the apparatus is arranged so that it is easily and quickly accomplished.

The momentary back flow of liquid in the filter which helps dislodge the filter cake when the liquid supply is shut off is caused by the expansion of air trapped in the upper chamber of the filter housing. The amount of back flow however is limited by the provision of a specially positioned expansion tank so that the charge of filter aid in the lower chamber will not be flushed into the supply pump and cause difficulty.

The increase in pressure drop through the filter, this increase being a sign that the surface of the filter aid cake is becoming slimed over, is used periodically to control the shutting off of the liquid supply pump. This automatically leads to the disintegration of the filter aid cake and after a minute or so the supply can be turned on again and the filter will perform with renewed efficiency. A single relatively large charge of filter aid can be recycled in this way many times before it must be replaced with a fresh charge.

A better understanding of the invention together with a fuller appreciation of its many advantages will best be gained from the following description given in connection with the accompanying drawings wherein:

FIGURE 1 shows filter apparatus embodying features of the invention, the filter housing being shown in an enlarged perspective view and partly broken away;

FIGURE 2 is an enlarged side section view of the filter housing;

Figure 3:
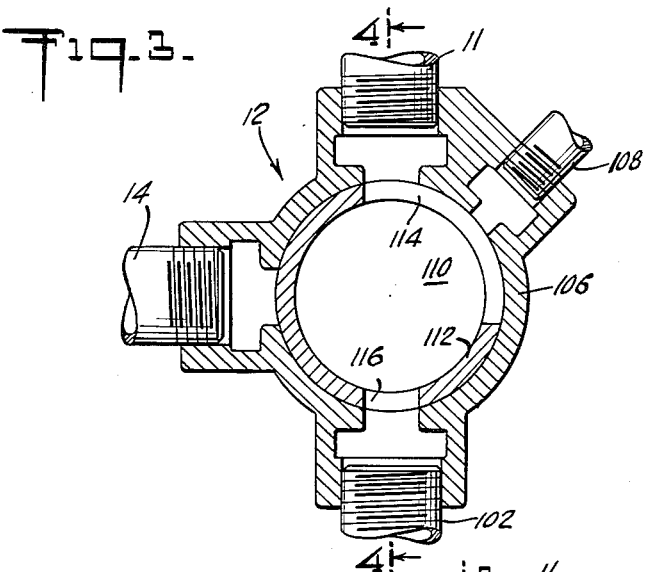
FIGURE 3 is a section view of a valve used in the apparatus of FIGURE 1, this section view being taken as indicated by lines 3—3 in FIGURE 4.

The filter apparatus illustrated in FIGURE 1 comprises a filter housing 10 the bottom of which is supplied with liquid to be filtered through a pipe 11 and a valve 12 by the pipe 14 from a centrifugal (non-positive displacement) pump 16. This pump is driven by an electric motor 18 and is supplied with liquid through the pipe 20 which has a check valve 22 from a source (not shown). Filtered liquid flows out of the top of housing 10 through the short vertical tube 24 which joins an outlet pipe 26 and check valve 27.

As indicated in FIGURE 2, liquid flow through housing 10 is upward from pipe 11 in the direction of the arrows and out through tube 24. The interior of the housing is divided into the upper and lower chambers 28 and 30, respectively, by a horizontally positioned septum 32. This septum consists of a top supporting disc 34 of a relatively coarse screen of stainless steel or the like and a lower disc filter screen 36 of a very fine light-weight mesh. The rims of these discs are clamped together between the flange 38 integral with the upper portion of the housing and the flange 40 integral with the lower part. The diameter of the coarse upper disc 34 is somewhat less than the diameter of the flanges, the remaining distance being filled by the liquid sealing circular gasket 42 which radially abuts the rim of disc 34. A thin gasket 44 lies between discs 34 and 36 and another such gasket 46 lies between disc 36 and flange 40, the three gaskets 42, 44 and 46 providing a liquid tight seal around the rim of the filter septum and between the upper and lower portions of the housing. Flanges 38 and 40 are held together by the bolts 48 spaced along the flanges and passing through them. Three of these bolts, symmetrically placed relative to each other, continue downward as the posts 50 to form a tripod support for housing 10.

The lower portion of housing 10 is funnel-shaped or conical narrowing downward to where it joins pipe 11. When the filter is standing idle and there is no flow through it, the charge of filter aid in lower chamber 30 drops to the bottom and mounds up on top of the end of pipe 11. To prevent the high velocity liquid stream from disturbing even formation of filter aid cake on the septum and incidentally to keep the filter aid from falling into the inlet pipe, the inlet is capped with a baffle plate 52, supported on three studs 53, and which is perforated by stamping up from the plane of the plate closely spaced stirrup loops. These loops permit liquid to flow horizontally around them but not straight up and also act as louvers to divert the filter aid when it settles to the bottom of chamber 30. Liquid in passing between the baffle plate and the shell of chamber 30 provides turbulence to stir up the filter aid resting in lower portion of that chamber.

When liquid begins to flow from pipe 11 through the filter (in the direction indicated by the arrows in FIGURE 2), it immediately agitates and carries upward with it the filter aid accumulated in the bottom of chamber 30 and deposits it against lower screen 36 where it forms as a thin filter cake 54. Thereafter while flow continues all liquid passes upward through this cake.

To resist the upward pressure against septum 32 during flow, the top of the housing is fitted with the concentric supporting sleeves or thin cylinders 56 whose upper edges are welded to the inside top of the housing and whose lower edges bear against the upper or support screen 34 and hold the septum generally planar. Liquid flow just above the septum transverse to these support cylinders is facilitated by the vents or holes 57 through them.

The lower end of tube 24, which comprises the outlet from housing 10, projects down into the housing to just above septum 32. This arrangement creates an air reservoir 58 in the top of the housing above the liquid level at 60. Because of the pressure of the liquid, during operation of the filter the air trapped in reservoir 58 will be compressed somewhat. The air pressure in the various sections of reservoir 58 is equalized by the vents 59 through cylinders 56. When the liquid pump is shut off this trapped air will expand and force some liquid then above septum 32 down through it. This action, aiding gravity, will immediately break the cake of filter aid away from the septum and cause the cake to fall and disintegrate as previously explained.

Though liquid flows backward out of the filter each time pump 18 is turned off, only a limited amount is permitted to flow in this direction. To control the reverse flow, check valve 22 is placed in the inlet pipe 20. No reverse flow through this valve is permitted. Positioned between this valve and the inlet of pump 16 is a small expansion tank 62 which is completely closed and which is connected into pipe 20 by the pipe 63 extending upward. The top of this tank has a petcock 64 so that all the air can be bled from the tank prior to starting the pump. To insure that liquid is not sucked out of the filter by syphon action through pipes 24 and 26 when the pump stops (such suction might otherwise prevent back flow through septum 32) a check valve 65 is mounted at the junction of pipes 24 and 26. This valve is closed against internal pressure but permits air to bleed into pipe 24 if there is any suction there.

When pump 16 is operating, it not only draws liquid from pipe 20 but sucks the liquid out of tank 62 thereby leaving it under partial vacuum. When the pump stops, reverse flow of liquid through it quickly fills tank 62 whereupon this reverse flow stops because of check valve 22. This limited amount of reverse flow is sufficient to dislodge filter cake 54 and cause it to drop away from septum 32. However, not enough reverse flow is permitted to leave the pump un-primed or to flush any of the filter aid into the pump. As an extra precaution, though, pipe 14 has a gooseneck bend 66 which rises to just above the level of septum 32.

During a cycle of operation of the filter, as filter cake 54 becomes more and more blinded by an accumulating layer of slime, the pressure in pipe 14 rises. This pressure is metered through a tube 67 connected into pipe 14 and running to a gauge 68. Tube 67 also runs to a pressure responsive electric switch 70 in the control circuit 72. When the pressure in pipe 14 exceeds a predetermined value, switch 70 is actuated and stops motor 18 and pump 16. After a timed delay, the motor is automatically re-started and the filter operation is resumed.

Power line voltage (110 volts, A.C., for example) is applied to circuit 72 by the pair of leads 80 and 82. Connected with lead 80 is a first switch 83 in series with a second switch 84 both of which are controlled by a timer 86, and which are each normally in position 1 as shown. Connected in series with position 1 of switch 84 are two parallel branches the first of which comprises pressure switch 70 which is also in series with a solenoid 88 whose other side is connected to power lead 82. The pressure switch is normally open and controls the action of solenoid winding 88 and the starting of timer 86. The second branch in parallel is the motor control relay solenoid 94 which, when energized, turns on motor 18 by closing the switches 96 and 97.

When pressure switch 70 closes, upon the pressure in the filter exceeding a predetermined level, solenoid 88 is energized and through its armature 90 moves switch 84 to position 2 thereby starting the timer. The moving of switch 84 from position 1 de-energizes the relay 94 and opens the switches 96 and 97 which stop motor 18.

As soon as the timer starts a cycle it mechanically holds switch 84 in position 2 for a suitable time, for example, one minute. During this interval relay 94 will remain un-energized and motor 18 turned off, thus allowing sufficient time for the filter cake to drop and settle. At the end of this cycle, timer 86 moves switch 84 back to position 1 to energize relay 94 and restart the motor. The filtering operation will then continue until the pressure again exceeds the predetermined level, whereupon the above cycle will be repeated.

A given charge of filter aid eventually after a number of these cycles becomes saturated with solid matter extracted from the liquid being filtered. Therefore the circuit 72 is arranged to shut off operation entirely after a predetermined number of cycles and to keep it off until the spent charge of filter aid is drained from chamber 30 and a new charge poured in. Thus, after completing six cycles of starting and stopping the pump motor, timer 86 during its actuation for the sixth time, moves switch 83 from position 1 to position 2. This turns motor 18 off (by de-energizing relay 94) lights the signal light 100 and leaves the circuit un-energized. After the filter has been serviced, switch 83 can be manually reset to position 1 and the timer will complete its previous interrupted cycle to begin another set of six cycles.

The lighting of lamp 100, which lighting may occur once in a 24 hour period, for example, depending on the size and capacity of the filter and on the amount of solids in the liquid being filtered, signals that the filter needs attention. An operator then comes and services it as follows. As seen in FIGURE 1, valve 12 can be set in any one of three positions. In position 1 as shown, supply pipe 14 is connected to inlet pipe 11. To drain the filter, once the pump has been stopped, valve 12 is moved from position 1 through position 2 to position 3. Then the liquid and sludge in filter chamber 30 will drain out through pipe 102.

Figure 4:
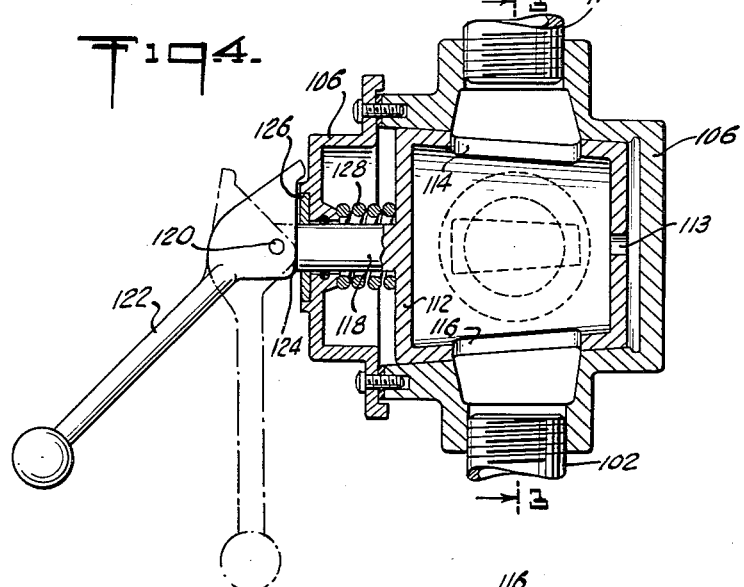
FIGURE 4 is a side section view of the valve taken as indicated by lines 4—4 in FIGURE 3.
Figure 5:
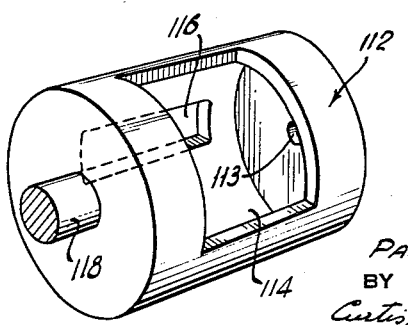
FIGURE 5 is a perspective view of a movable inner portion of the valve.

The internal structure of valve 12 is shown in FIGURES 3, 4 and 5. The valve includes a housing 106 into which are screwed the ends of the pipes 11, 14 and 102 and the end of the pipe 108, pipes 11 and 102 having a common axis and with pipe 14 at right angles and pipe 108 at 45° relative to this axis. Rotatably mounted within the central opening 110 of the housing is a tapered sleeve 112 which is completely enclosed at its two ends, except for a small relief hole 113, and around its circumference except for the two openings 114 and 116. This sleeve is shown apart from other elements of the valve in FIGURE 5. Opening 114 is slightly more than a 90° sector of the sleeve while opening 116 is no wider than the port at the end of a pipe and is oriented relative to opening 114 as shown to scale in FIGURE 3.

As seen in FIGURE 4, the front end of the sleeve carries a stub shaft 118 whose outer or left end is pivoted at 120 to the handle 122. This handle is adapted to be swung down to the dotted line position shown so that its cam projection or spur 124 can bear against the bearing ring 126 carried on the front part of housing 106. In camming against this ring the handle pulls pin 120 upward, that is, to the left in FIGURE 4, against the action of the spring 128 and slides sleeve 112 a small distance free of engagement with housing 106. Then, the handle can be rotated freely from position 1 to position 2 or 3, for example, to set openings 114 and 116 in sleeve 112 opposite the desired ones of the pipes ends 11, 14, 102 and 108. When handle 122 is released, spring 128 will seat the sleeve against the housing and the two will be locked together by friction.

Sleeve 112 in FIGURE 3 stands in position 3. In this position the ends of pipes 11, 102 and 108 are uncovered and pipe 14 is blocked. Liquid inside the filter is therefore permitted to drain out through drain pipe 102. Pipe 108 standing open during this draining allows air to bubble into the filter. After the filter has been drained, valve 112 is rotated from position 3 to position 2 wherein the ends of both pipes 14 and 102 are closed by sleeve 112 but the ends of pipes 11 and 108 remain uncovered by opening 114. Liquid containing a measured amount of filter aid is then poured down through pipe 108 from funnel 130 through the central opening 110 in the valve and up into the filter. If desired to bypass the filter, valve 12 can be turned 90° clockwise from the position shown in FIGURE 3, and then opening 116 will be moved opposite pipe 14 and opening 114 opposite pipe 102.

After the filter has been re-charged, valve 12 is turned to position 1 wherein the ends of pipes 11 and 14 will be uncovered by opening 114 in sleeve 112, but the ends of pipes 102 and 108 blocked off. The apparatus is now in a position for operation which as explained above, is initiated by manually re-setting switch 83. Thereafter the filter will continue its cyclic operation in the way described until a predetermined number of individual cycles has been completed.

In an actual filter substantially identical to that described herein which has been built and successfully operated in conjunction with a 20,000 gallon swimming pool, the internal diameter of septum 32 was 14 inches with an area of approximtaely 1 square foot, the various other structural parts of the filter housing being as shown approximately to scale in FIGURE 2. About one-half pound of Johns-Manville Celite No. 545 filter aid powder was placed in lower chamber 30 and when the filter was running formed into a cake approximately ½ inch thick. The capacity of this filter operating with water from the city mains was 22 gallons per minute on the average. A 1½ horsepower motor was used to drive a centrifugal (non-positive displacement) pump having a relatively sharply increasing pressure for decreasing flow characteristic. Timer 86 was a Tork timer No. TA–12M 1197 ST 12. Filter screen 36 was a closely woven screen of 0.0045 inch diameter wire 100 by 100 mesh and served efficiently to prevent the filter aid particles of the grade used from passing through it. An auxiliary filter cloth in addition to screen 36 can be used but is not necessary in this application of the filter.

In initially filling the swimming pool with water from the city mains passing through the filter in the first instance, a first cycle operation of the filter lasted about 45 minutes and this decreased to about 20 minutes on the sixth cycle. A number of sets of six cycles was required in filling the pool. However, after the pool had been filled with filtered water (which was of sparkling clarity), the water could be continuously re-cycled through the filter and a single set of six cycles of operation would then last for almost a week. On the basis of these results it will be appreciated that the invention provides a low cost, highly efficient and easy-to-maintain filter.

The above description is intended in illustration and not in limitation of the invention. Liquids other than water can be filtered. Various changes in the apparatus may occur to those skilled in the art and these may be made without departing from the spirit or scope of the invention as set forth.

I claim:

1. High efficiency liquid filter apparatus comprising a housing enclosing a vertical central volume, a filter septum generally horizontally positioned and dividing said housing into an upper chamber and a lower chamber extending downward to an inlet opening, liquid supply means including a pipe and a centrifugal pump for supplying a flow of liquid to said inlet and upward into said lower chamber, a check valve in said supply pipe, an air expansion chamber branched onto said supply pipe between said check valve and said pump, a liquid outlet pipe extending from said upper chamber, a charge of filter aid contained in said lower chamber, and an electric control circuit including a pressure responsive switch for stopping said pump when the pressure in said lower chamber exceeds a predetermined level, said circuit including a timer and counter for restarting said pump after a short interval and after a predetermined number of times of turning on said pump for turning it off until manually restarted whereby the used charge of filter aid can be removed from said lower chamber and a fresh charge introduced therein.

2. Improved filter apparatus of the character described comprising a hollow housing enclosing a central volume, a filter septum horizontally within said housing and dividing said volume into upper and lower chambers, a charge of filter aid in said lower chamber, liquid supply means including a pump for supplying liquid to the bottom of said lower chamber, an outlet pipe from said upper chamber, electric control means including a pressure responsive switch and a timer for stopping and shortly thereafter re-starting said pump a plurality of times when the pressure in said lower chamber of said filter rises above a given value, and means responsive to the number of times said pump has been restarted to keep it turned off after a pre-determined number of operating cycles whereby the charge of filter aid in said lower chamber is efficiently utilized.

References Cited in the file of this patent

UNITED STATES PATENTS

| Re. 24,055 | Daniels | Aug. 30, 1955 |
| 663,646 | Tait | Dec. 11, 1900 |
| 678,870 | Grever | July 23, 1901 |
| 723,110 | Wilmington | Mar. 17, 1903 |
| 732,010 | Savage | June 23, 1903 |
| 1,133,853 | Gold | Mar. 30, 1915 |
| 1,160,627 | Little | Nov. 16, 1915 |
| 1,965,783 | Traudt | July 10, 1934 |
| 2,046,770 | Coberly | July 7, 1936 |
| 2,057,570 | Haentjens | Oct. 13, 1936 |
| 2,253,690 | Dalrymple | Aug. 26, 1941 |
| 2,423,172 | Booth | July 1, 1947 |
| 2,441,526 | Zollinger | May 11, 1948 |
| 2,468,603 | Pew | Apr. 26, 1949 |
| 2,494,534 | Armstrong | Jan. 17, 1950 |
| 2,523,793 | Vance | Sept. 26, 1950 |
| 2,562,699 | Cooperson | July 31, 1951 |
| 2,562,730 | Miller | July 31, 1951 |
| 2,600,458 | Ackley et al. | July 17, 1952 |
| 2,780,363 | Pew | Feb. 5, 1957 |
| 2,867,327 | Hirs | Jan. 6, 1959 |
| 2,878,938 | Dee | Mar. 24, 1959 |
| 2,937,752 | Deschere | May 24, 1960 |